US011331870B2

(12) United States Patent
Farr et al.

(10) Patent No.: US 11,331,870 B2
(45) Date of Patent: May 17, 2022

(54) MOLD ASSEMBLY FOR SHAPING AND CUTTING SOCK LINERS

(71) Applicant: NIKE, Inc., Beaverton, OR (US)

(72) Inventors: Todd R. Farr, Los Gatos, CA (US); Howard Fu, Taichung (TW)

(73) Assignee: NIKE, Inc., Beaverton, OR (US)

( * ) Notice: Subject to any disclaimer, the term of this patent is extended or adjusted under 35 U.S.C. 154(b) by 508 days.

(21) Appl. No.: 15/992,397

(22) Filed: May 30, 2018

(65) Prior Publication Data

US 2018/0345613 A1 Dec. 6, 2018

Related U.S. Application Data

(60) Provisional application No. 62/513,143, filed on May 31, 2017.

(51) Int. Cl.
*B29D 35/12* (2010.01)
*B29C 33/38* (2006.01)
(Continued)

(52) U.S. Cl.
CPC .......... *B29D 35/128* (2013.01); *A43B 17/006* (2013.01); *A43B 17/14* (2013.01);
(Continued)

(58) Field of Classification Search
CPC .......................... B29D 35/128; B29D 35/148; B29D 35/0081; B29D 35/142; B29C 33/3885;
(Continued)

(56) References Cited

U.S. PATENT DOCUMENTS 1,569,689 A * 1/1926 Gino Vannoni ........ B29C 37/02
425/181
5,253,995 A * 10/1993 Romstad ............. B29C 49/4802
264/524
(Continued)

FOREIGN PATENT DOCUMENTS

CN 103171085 A 6/2013
CN 204172247 U 2/2015
(Continued)

OTHER PUBLICATIONS

International Search Report and Written Opinion dated Aug. 10, 2018 in International Patent Application No. PCT/US2018/035106, 16 pages.

(Continued)

*Primary Examiner* — Joseph S Del Sole
*Assistant Examiner* — Baileigh Kate Darnell
(74) *Attorney, Agent, or Firm* — Shook, Hardy & Bacon L.L.P.

(57) ABSTRACT

Aspects hereof relate to a multi-part mold assembly for use in manufacturing articles. The mold assembly provides for contouring, shaping and cutting materials to form articles via a continuous single processing operation. The mold assembly includes an upper mold portion with a three-dimensional contouring/shaping portion and a first cutting edge, a lower mold portion with a three-dimensional contouring/shaping portion and a second cutting edge, and a base portion into which the lower mold portion may retract during use. Upon application of a first force, the upper and lower mold portions cooperate to contour/shape a material from which an article is to be formed. Upon application of a second force greater than the first, the first cutting edge and the second cutting edge interact to shear the material that extends beyond the respective cutting edges. The result is an (Continued)

article that is contoured, shaped and cut/trimmed utilizing a single processing operation.

15 Claims, 15 Drawing Sheets

(51) Int. Cl.
    *B29D 35/14*      (2010.01)
    *A43B 17/14*      (2006.01)
    *A43B 17/00*      (2006.01)
    *B29D 35/00*      (2010.01)
    *A43B 23/28*      (2006.01)
    *B22C 9/22*      (2006.01)
    *B29L 31/50*      (2006.01)

(52) U.S. Cl.
    CPC .......... *A43B 23/28* (2013.01); *B29C 33/3885* (2013.01); *B29D 35/0081* (2013.01); *B29D 35/142* (2013.01); *B29D 35/148* (2013.01); *B22C 9/22* (2013.01); *B29K 2823/083* (2013.01); *B29L 2031/507* (2013.01)

(58) Field of Classification Search
    CPC ......... B29K 2823/083; B29L 2031/507; A43B 17/14; A43B 17/006; A43B 23/28; B22C 9/22
    See application file for complete search history.

(56) References Cited

U.S. PATENT DOCUMENTS

| | | | | |
|---|---|---|---|---|
| 7,313,876 B2* | 1/2008 | Morgan | ............... | A43B 1/0027 36/59 R |
| 7,704,430 B2* | 4/2010 | Johnson | ............... | B29D 35/148 264/273 |
| 7,731,883 B2* | 6/2010 | Johnson | ............. | B29D 35/0018 264/259 |
| 8,470,113 B2* | 6/2013 | Beye | ....................... | A43B 13/20 156/145 |
| 9,241,541 B2* | 1/2016 | Beye | .................... | B29D 35/122 |
| 2003/0098118 A1 | 5/2003 | Rapaport | | |
| 2007/0278714 A1 | 12/2007 | Johnson et al. | | |
| 2007/0278716 A1 | 12/2007 | Johnson et al. | | |
| 2009/0152774 A1* | 6/2009 | Hensley | ............... | A43B 13/189 264/524 |
| 2013/0333827 A1* | 12/2013 | Beye | .................... | B29D 35/128 156/145 |
| 2013/0340295 A1* | 12/2013 | Adami | ............... | B29D 35/0054 36/25 R |
| 2016/0128425 A1* | 5/2016 | Beye | ........................ | B32B 3/06 428/72 |

FOREIGN PATENT DOCUMENTS

| | | |
|---|---|---|
| CN | 204451099 U | 7/2015 |
| CN | 206170542 U | 5/2017 |
| JP | H10329238 A | 12/1998 |
| KR | 100604990 B1 | 7/2006 |
| TW | 514584 B | 12/2002 |
| WO | 2006057019 A1 | 6/2006 |

OTHER PUBLICATIONS

International Preliminary Report on Patentability dated Dec. 19, 2019 in International Patent Application No. PCT/US2018/035106, 11 pages.

* cited by examiner

MOLD ASSEMBLY FOR SHAPING AND CUTTING SOCK LINERS

CROSS-REFERENCE TO RELATED APPLICATIONS

This application entitled "Mold Assembly for Shaping and Cutting Sock Liners" claims priority to U.S. Provisional Patent Application No. 62/513,143, entitled "Mold Assembly for Shaping and Cutting Sock Liners," and filed May 31, 2017. The entirety of the aforementioned application is incorporated by reference herein.

TECHNICAL FIELD

Aspects hereof relate to molds for manufacturing articles, e.g., sock liners for use in shoes. Aspects further relate to methods of manufacturing articles utilizing a mold configured for shaping and cutting utilizing a continuous single processing operation.

BACKGROUND

Manufacturing articles for which a particular shape and/or contour is desired utilizing molds generally requires the use of multiple processing steps. For instance, once a material is appropriately positioned relative to the mold, in a first processing step, a force (e.g., pressure, heat, or the like) is applied to the resultant material/mold assembly to provide the article with the desired three-dimensional contouring. After contouring, in a second processing step, a trimming or cutting operation is performed to trim any excess material extending beyond an edge of the mold such that the remaining processed article is contoured and shaped in accordance with the mold. Such multi-step mold manufacturing is inefficient and prone to error as materials are subjected to multiple forces and/or transported between processing stations.

BRIEF SUMMARY

Aspects hereof relate to multi-part manufacturing mold assemblies for contouring, shaping and cutting/trimming materials to form articles of manufacture, e.g., sock liners for use in shoes, via a continuous single processing operation. Multi-part molds in accordance with aspects hereof include, at least, an upper mold portion, a lower mold portion and a base portion. At least a portion of the upper mold portion includes a three-dimensional shape that corresponds with a contour of a first surface of an article to be manufactured utilizing the mold assembly. The three-dimensional shape, for instance, may correspond with the contour of a first surface of a sock liner such that upon positioning a desired material in contact with the upper mold portion (and generally upon application of an appropriate force, e.g., heat, pressure, or the like), the material will take on the contour of the three-dimensional shape. Aspects hereof further contemplate that the three-dimensional shape includes a first cutting edge at at least a portion of the perimeter thereof. The first cutting edge may be integral with the three-dimensional shape, may be removably coupled with the three-dimensional shape, or a combination thereof.

The lower mold portion, in accordance with aspects hereof, includes a three-dimensional shape that corresponds with a contour of a second, opposite surface of the article to be manufactured utilizing the mold assembly. Continuing with the example provided above, for instance, the three-dimensional shape of the lower mold portion may correspond with the contour of a second surface of the sock liner that opposes the first surface such that upon positioning the desired material in contact with the lower mold portion (and application of an appropriate force), the second surface will take on the contour of the three-dimensional shape provided by the lower mold portion. Aspects hereof further contemplate that the three-dimensional shape of the lower mold portion includes a second cutting edge at at least a portion of the perimeter thereof. The second cutting edge may be integral with the three-dimensional shape, may be removably coupled with the three-dimensional shape, may be provided as a cutting plate component separate from a mold component of the lower mold portion, or a combination thereof. Aspects hereof further provide for at least one vertical channel in the lower mold portion configured for receiving one more springs, the springs providing the appropriate force(s) for contouring, shaping and cutting/trimming, as more fully described below.

The base portion, in accordance with aspects hereof, includes at least one cavity shaped for receiving the lower mold portion such that the lower mold portion is retractable in a substantially vertical direction within the cavity of the base portion upon application of an appropriate force to one or more springs positioned within the vertical channels of the lower mold portion. In aspects where a cutting plate is utilized as a component separate from a molding part of the lower mold portion, the base further is configured to support the plate at its appropriate relative position.

Aspects hereof further relate to methods of manufacturing articles, e.g., sock liners, utilizing a multi-part manufacturing mold assembly as described herein. The method includes positioning a material between the upper mold portion and the lower mold portion of the mold assembly, causing the upper mold portion and the lower mold portion to cooperate with one another to provide a three-dimensional shape or contour to the material by applying a first force to at least one spring positioned within a vertical channel of the lower mold assembly, and causing the first cutting edge of the upper mold portion and the second cutting edge of the lower mold portion to cooperate with one another to shear the material by applying a second force to the at least one spring, the second force being greater than the first force.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative aspects hereof are described in detail below with reference to the attached drawing figures, which are incorporated by reference herein and wherein.

DETAILED DESCRIPTION

Figure 1:
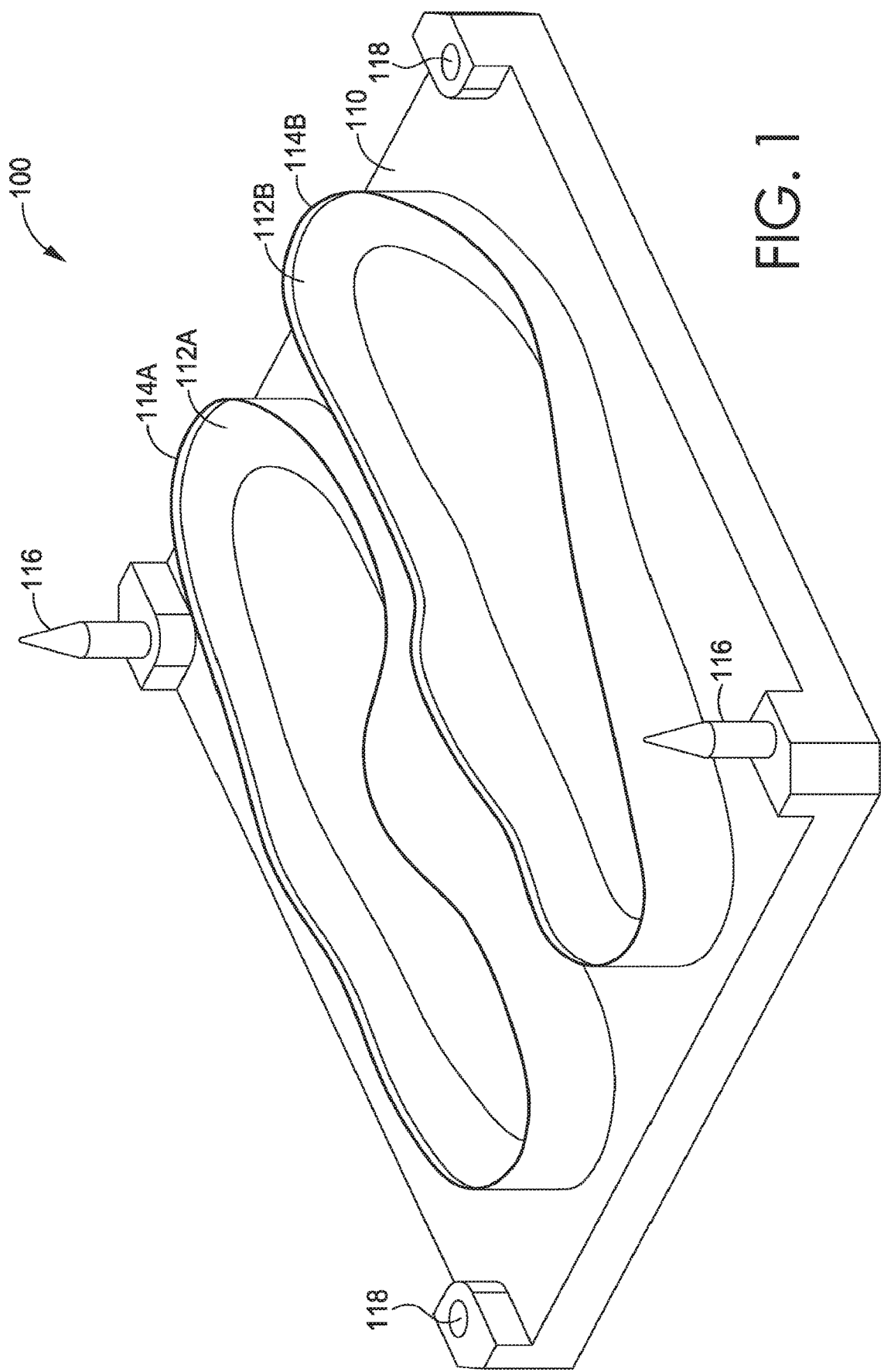
FIG. 1 depicts an upper mold portion of a multi-part mold assembly, in accordance with exemplary aspects hereof.

The subject matter herein is described with specificity to meet statutory requirements. However, the description itself is not intended to limit the scope of this patent. Rather, the inventors have contemplated that the claimed subject matter also might be embodied in other ways, to include different elements or combinations of elements similar to the ones described in this document, in conjunction with other present or future technologies.

Aspects hereof contemplate a multi-part manufacturing mold assembly (e.g., a manufacturing mold assembly having at least two discrete portions) for use in manufacturing articles, for instance, sock liners, from non-rigid materials. The multi-part mold assembly provides for contouring, shaping and cutting/trimming materials to form articles of manufacture via a continuous single processing operation. For instance, the multi-part mold assembly, in exemplary aspects, includes an upper mold portion having a three-dimensional contouring or shaping portion and a first cutting edge, a lower mold portion having a three-dimensional contouring or shaping portion and a second cutting edge, and a base portion into which the lower mold portion at least partially may retract during use. In aspects, the lower mold portion includes one or more vertical channels, each vertical channel housing a spring. Upon application of a first force upon the springs, the upper mold portion and the lower mold portion may cooperate to contour (e.g., provide three-dimensional shape to) a material from which an article of manufacture is to be made. In aspects, application of the first force upon the springs may cause the lower mold portion to partially retract into a cavity formed in the base portion. Upon application of a second force upon the springs, the second force being greater than the first force, the first cutting edge of the upper mold portion and the second cutting edge of the lower mold portion may interact to shear (in a scissor-like motion) the material that extends beyond the position of the respective cutting edges, for instance, beyond the perimeter of cooperative three-dimensional portions of the upper and lower mold portions. In aspects, application of the second force upon the springs may cause the lower mold portion to fully retract into the cavity formed in the base portion. The result is an article that is contoured, shaped and cut/trimmed utilizing a single processing operation, that is, application of force to a multi-part mold assembly, as described herein. Processing articles utilizing a multi-part mold assembly in accordance with aspects hereof improves efficiency and reduces waste from deformed or otherwise misshapen articles as fewer processing steps are required to achieve a contoured, shaped and cut/trimmed article and movement between processing stations for contouring, shaping and cutting/trimming is eliminated.

Aspects hereof relate to a multi-part manufacturing mold assembly for manufacturing articles, e.g., sock liners, garments or garment portions, from non-rigid materials. Non-rigid materials may include, by way of example and not limitation, knit materials, woven materials, mesh materials, non-woven materials, leather materials, foamed materials, elastomeric polymers (e.g., ethylene vinyl-acetate (EVA)) and the like, or any combination thereof. Non-rigid materials utilized in the manufacture of articles often are fed, by way of example only, from material stock (e.g., material rolls or webs) having large quantities of material. Material from a material stock may be fed into a manufacturing system at an appropriate processing station of a plurality of processing stations sequentially arranged in an assembly line.

As will be discussed throughout, it is contemplated that a multi-part mold assembly in accordance with aspects hereof may include at least three discrete portions cooperating with one another to mold a desired article.

Activation of the springs permit substantially vertical movement of the lower mold portion (and cutting plate, where appropriate) up and down relative to the base portion. As used herein, the terms "up" and "down" refer to opposing movements in the latitudinal direction. As used herein, "substantially vertical movement" refers to vertical movement in the latitudinal direction relative to the base portion that may or may not also include horizontal movement to a lesser extent than the vertical movement. Substantially vertical movement results in a discernible vertical progression either up or down and may include, but does not necessarily include, a concurrent discernible horizontal progression.

As will be discussed throughout, it is contemplated that aspects provided herein also are directed to a method of manufacturing articles (or portions thereof) formed from non-rigid materials utilizing a multi-part manufacturing mold assembly. Articles may include, by way of example and not limitation, apparel, outerwear, sock liners, other portions of footwear, and the like.

Figure 14:
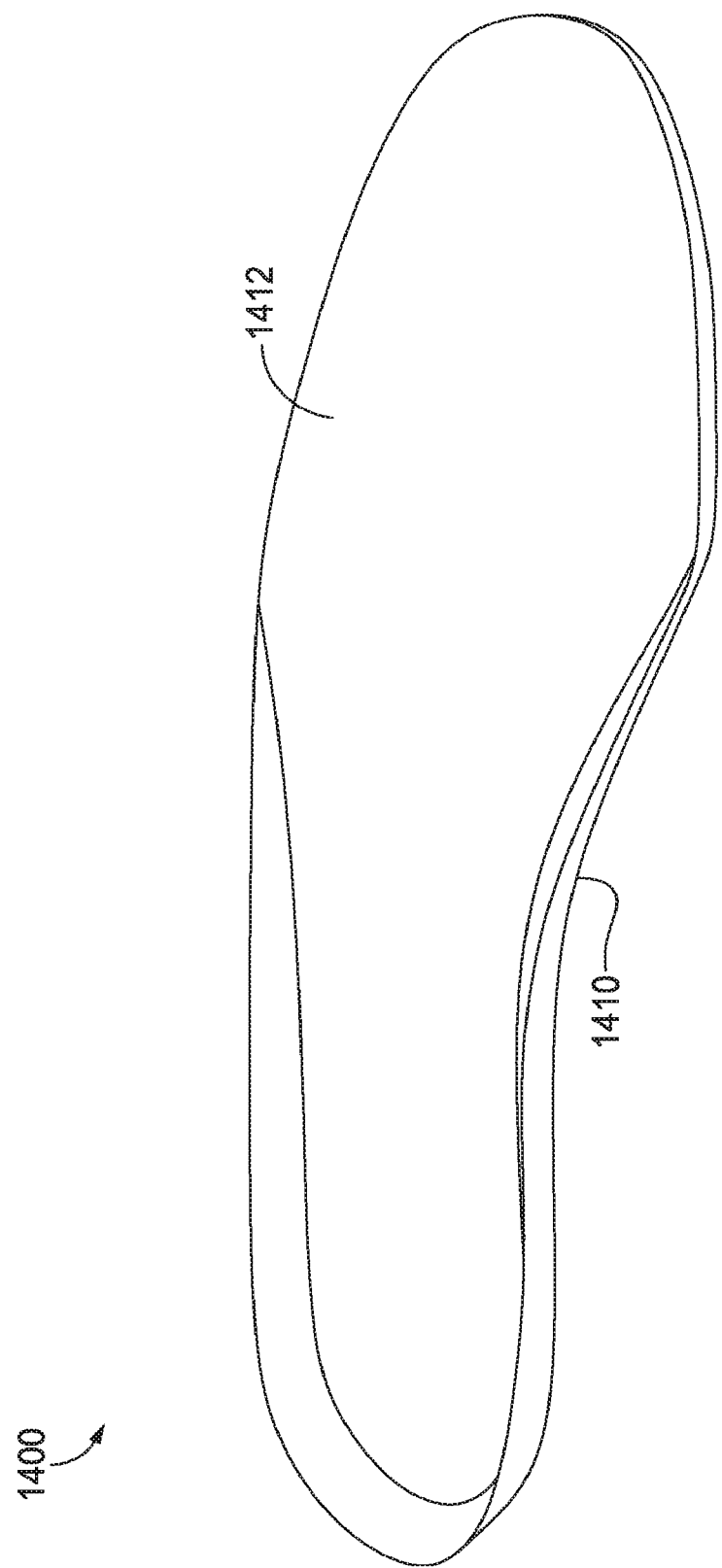
FIG. 14 depicts a schematic diagram of an exemplary sock liner that may be contoured, shaped and cut/trimmed utilizing a multi-part mold assembly as described herein, in accordance with exemplary aspects hereof.

Referring now to FIG. 1, an exemplary upper mold portion 100 of a multi-part mold assembly is illustrated, in accordance with exemplary aspects hereof. The upper mold portion 100 includes a substantially planar plate portion 110 and two portions 112A, 112B having a three-dimensional shape. The exemplary upper mold portion 100 of FIG. 1 (and all other FIGs. provided and described herein for the sake of description) may be utilized to form a sock liner for use in a shoe, for instance, a sock liner 1400 as illustrated in FIG. 14. It will be understood and appreciated by those having ordinary skill in the art that reference to and illustration of a sock liner merely is for ease of description and a multi-part mold assembly in accordance with aspects described herein may be utilized for other articles for which molding is desired. Reference to and illustration of a sock liner is not intended to limit the scope hereof in any way.

The two portions 112A, 112B of the upper mold portion 100 having a three-dimensional shape are shaped to correspond to a contour of a first surface of an article to be manufactured, i.e., a pair of sock liners. It is understood that a multi-part mold assembly in accordance with aspects hereof need not provide for molding of a pair of sock liners but may provide for molding of any number of sock liners (e.g., one or ten) in accordance with aspects hereof. A perimeter of each of the portions 112A, 112B of the upper mold portion 100 having a three-dimensional shape includes a cutting edge 114A, 114B. As contouring surfaces for two sock liners are illustrated in the exemplary upper mold portion 100, the cutting edge 114A, 114B extends around each of the perimeters of the three-dimensional portions 112A, 112B. It will be understood and appreciated by those having ordinary skill in the art that a cutting edge 114A, 114B may be provided at any location of the upper mold portion 100 where cutting or trimming of excess material is desired. Providing the cutting edge 114A, 114B at the perimeter of the three-dimensional shape that corresponds to a shape of the desired article of manufacture, however, permits contouring, shaping, and cutting/trimming utilizing a single processing step.

Aspects hereof contemplate that the cutting edge 114A, 114B may be integral to the upper mold portion 100 or may be removably coupled therewith. In particular exemplary aspects, the cutting edge 114A, 114B is removably coupled with the upper mold portion 100 such that upon dulling (or other defect) of the cutting edge 114A, 114B, replacement of the entire upper mold portion 100 is not necessary.

The illustrated upper mold portion 100 additionally includes a pair of guide pins 116 and a pair of receiving holes 118 configured to receive guide pins associated with a base portion of the multi-part mold assembly, as more fully described below. The guide pins 116 and receiving holes 118 aid in positioning and maintaining the portions of the multi-part mold assembly in their appropriate relative locations.

Figure 2:
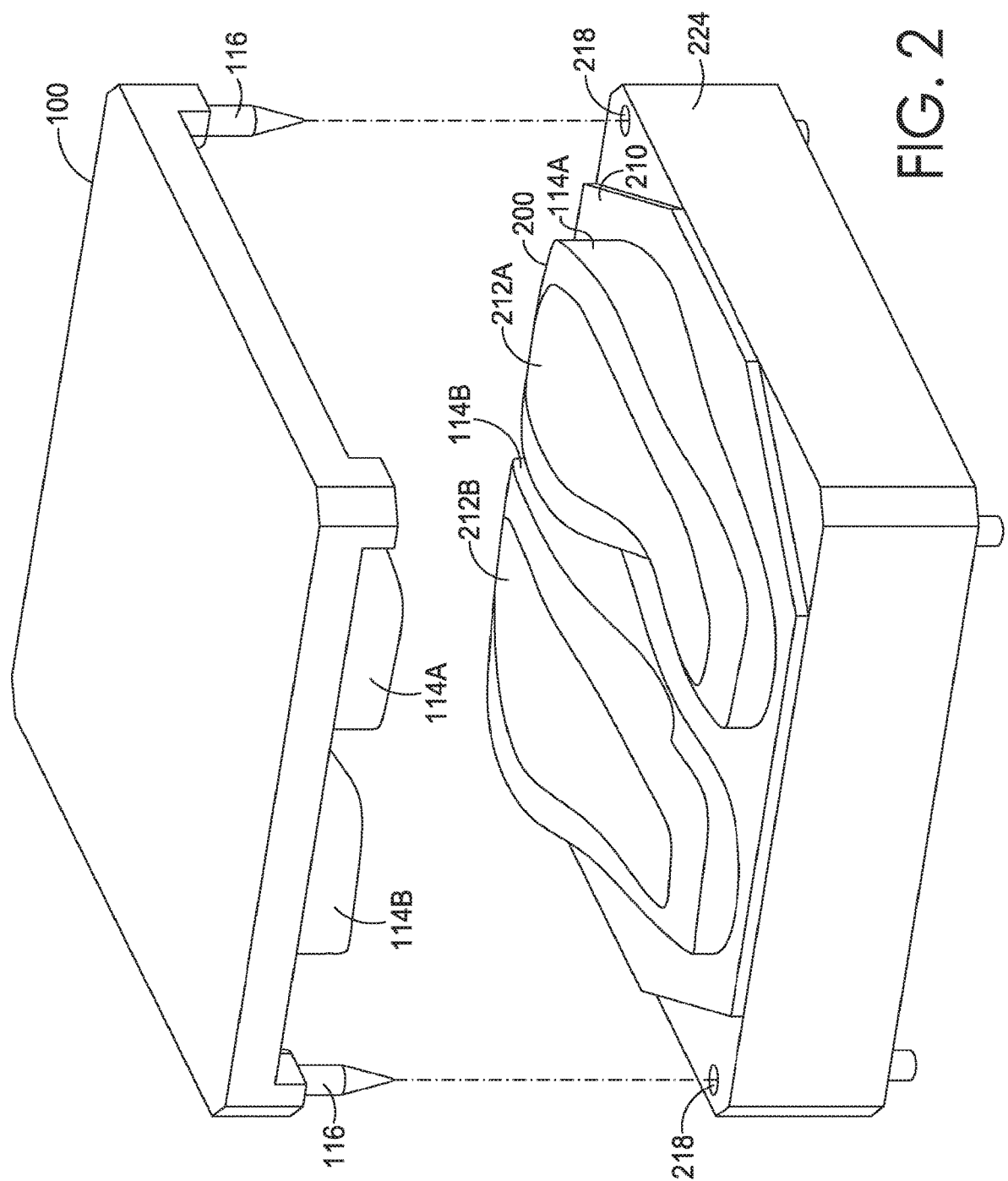
FIG. 2 depicts positioning of the upper mold portion of FIG. 1 in cooperation with a lower mold portion, in accordance with exemplary aspects hereof.

Turning now to FIG. 2, positioning of the upper mold portion 100 of FIG. 1 in cooperation with a lower mold portion 200 and a base 224 is illustrated, in accordance with exemplary aspects hereof. The lower mold portion 200 includes a substantially planar plate portion 210 and two portions 212A, 212B having a three-dimensional shape. The two portions 212A, 212B of the lower mold portion 200 having a three-dimensional shape are shaped to correspond to a contour of a second surface of an article to be manufactured, i.e., a pair of sock liners, the second surface being opposite the first surface (e.g., a top and bottom of a planar portion of material from which the article is manufactured). A perimeter of each of the portions 212A, 212B of the lower mold portion 200 having a three-dimensional shape includes a cutting edge 214A, 14B. As three-dimensional portions 212A, 212B for two sock liners are illustrated in the exemplary lower mold portion 200, the cutting edge 214A, 214B extends around each of the perimeters of the three-dimensional portions 212A, 212B. It will be understood and appreciated by those having ordinary skill in the art that a cutting edge 214A, 214B may be provided at any location of the lower mold portion 200 where cutting or trimming of excess material is desired. Providing the cutting edge 214A, 214B at the perimeter of the three-dimensional shape that corresponds to a shape of the desired article of manufacture, however, permits contouring, shaping, and cutting/trimming utilizing a single processing step.

Figure 3:
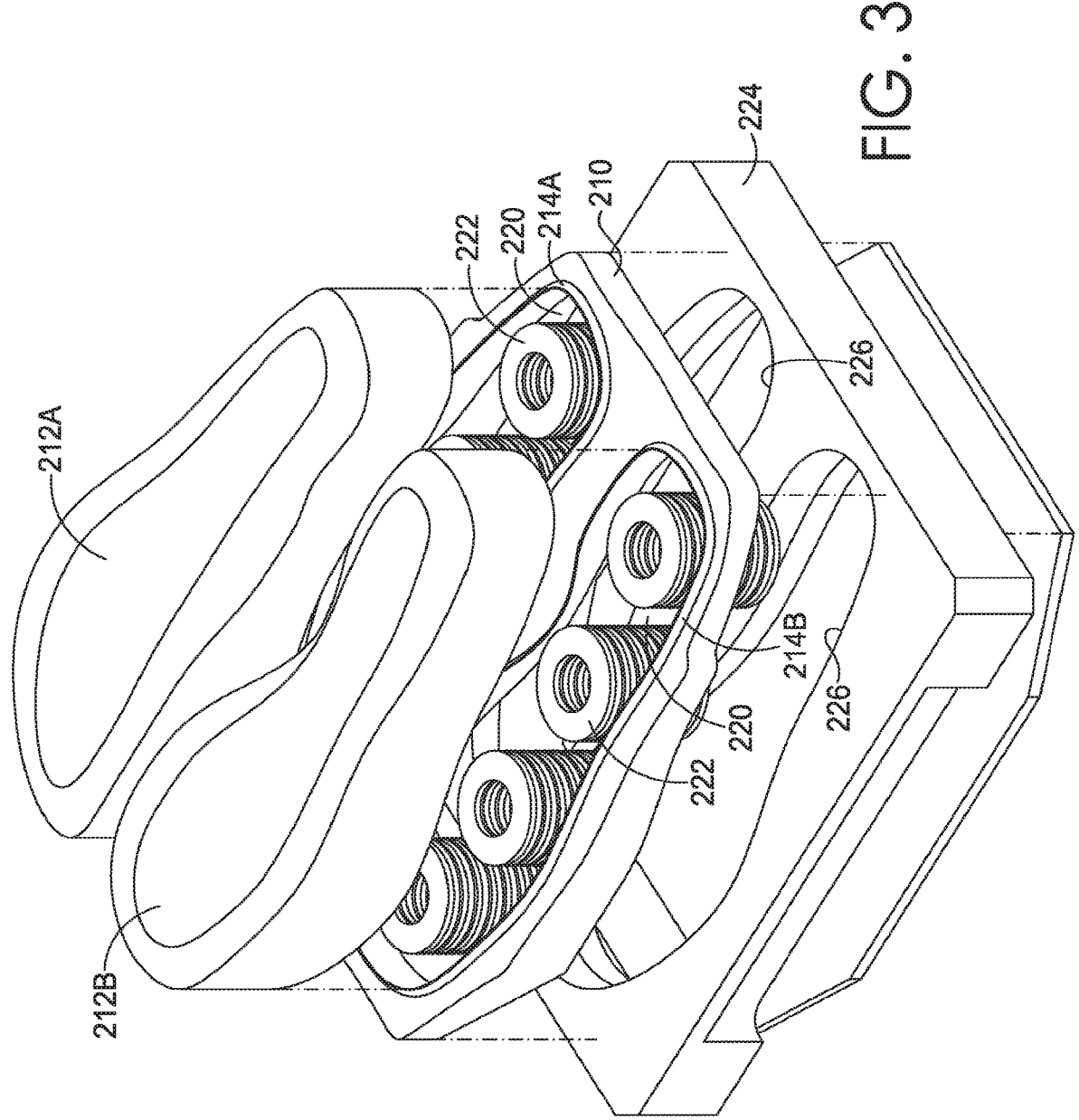
FIG. 3 depicts an exploded view of the lower mold portion illustrated in FIG. 2, in accordance with exemplary aspects hereof.

Aspects hereof contemplate that the cutting edge 214A, 214B may be integral to the lower mold portion 200 or may be removably coupled therewith. In particular exemplary aspects, the cutting edge 214A, 214B is removably coupled with the lower mold portion 200 such that upon dulling (or other defect) of the cutting edge 214A, 214B, replacement of the entire lower mold portion 200 is not necessary. In a further exemplary aspect, a cutting plate may be provided as the substantially planar portion 210 of the lower mold portion 200. In accordance with this exemplary aspect, the cutting plate 210 includes at least one aperture 220 therein (as best seen in FIG. 3, depicting an exploded view of the lower mold portion illustrated in FIG. 2) that is shaped to receive the three-dimensional portion 212A, 212B of the lower mold portion 200. The at least one aperture 220 includes the second cutting edge 214A, 214B at at least a perimeter portion thereof.

Figure 5:
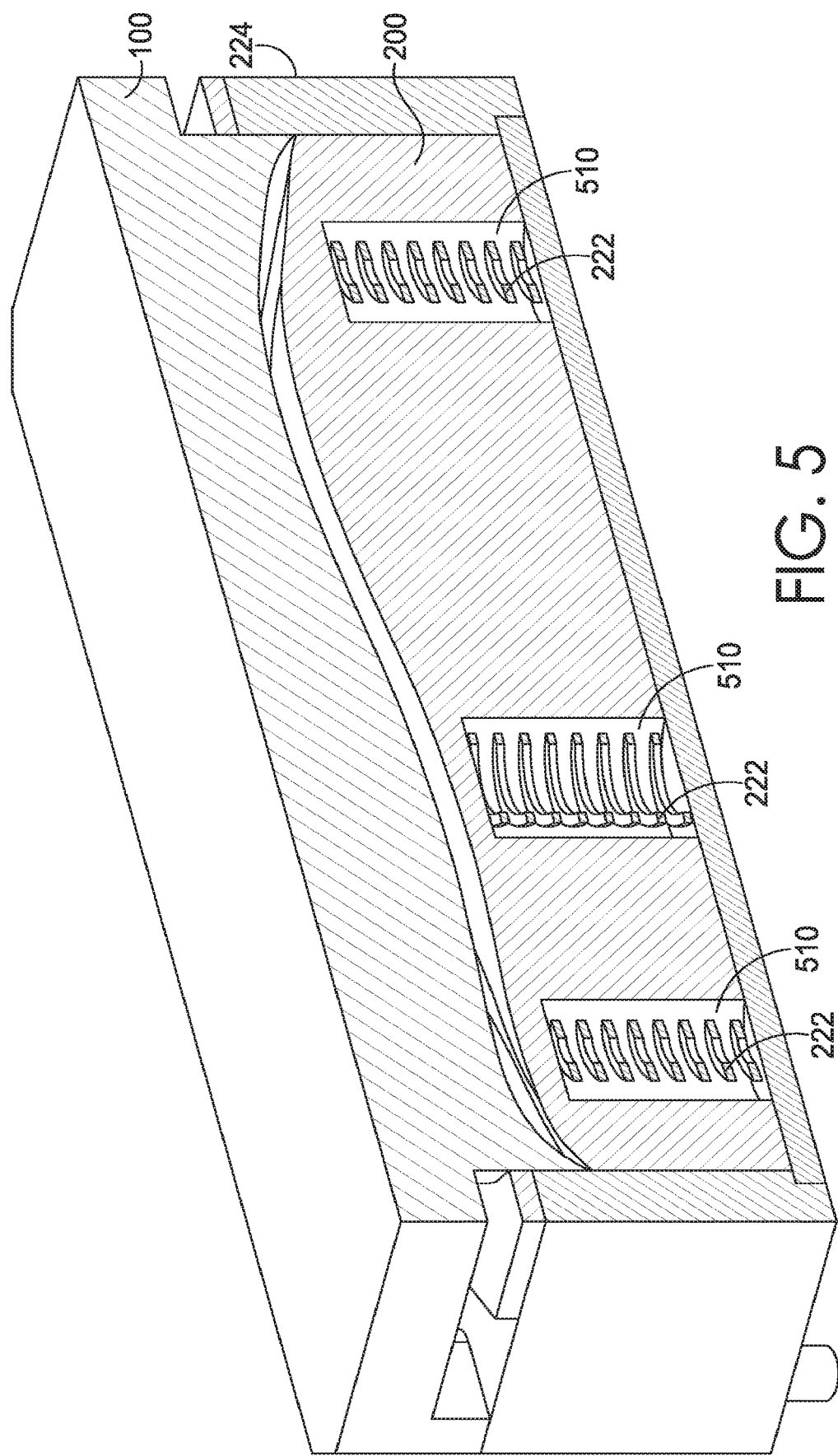
FIG. 5 depicts a cross section of a multi-part mold assembly in a fully retracted position, in accordance with exemplary aspects hereof.

As best seen in the cross section of FIG. 5, the lower mold portion 200 includes at least one vertical channel 510. The vertical channels 510 are configured for receiving springs 222 that provide the force necessary for contouring, shaping and cutting/trimming, in accordance with aspects hereof, as more fully described below.

A multi-part mold assembly in accordance with aspects hereof further includes a base portion 224. As best seen in the exploded view of FIG. 3, the base portion 224 includes at least one cavity 226 therein shaped for receiving the lower mold portion 200 such that the lower mold portion 200 is retractable in a substantially vertical direction (up and down) within the cavity 226 of the base portion 224 upon an appropriate force being applied to a plurality of springs 222 positioned within the plurality of vertical channels 510 (FIG. 5). FIG. 5 illustrates the lower mold portion 200 in a substantially fully retraced state within the cavity 226 of the base 224. As illustrated in FIG. 2, the base portion includes guide holes 218 for receiving the guide pins 116 of the upper mold assembly 100.

Figure 4:
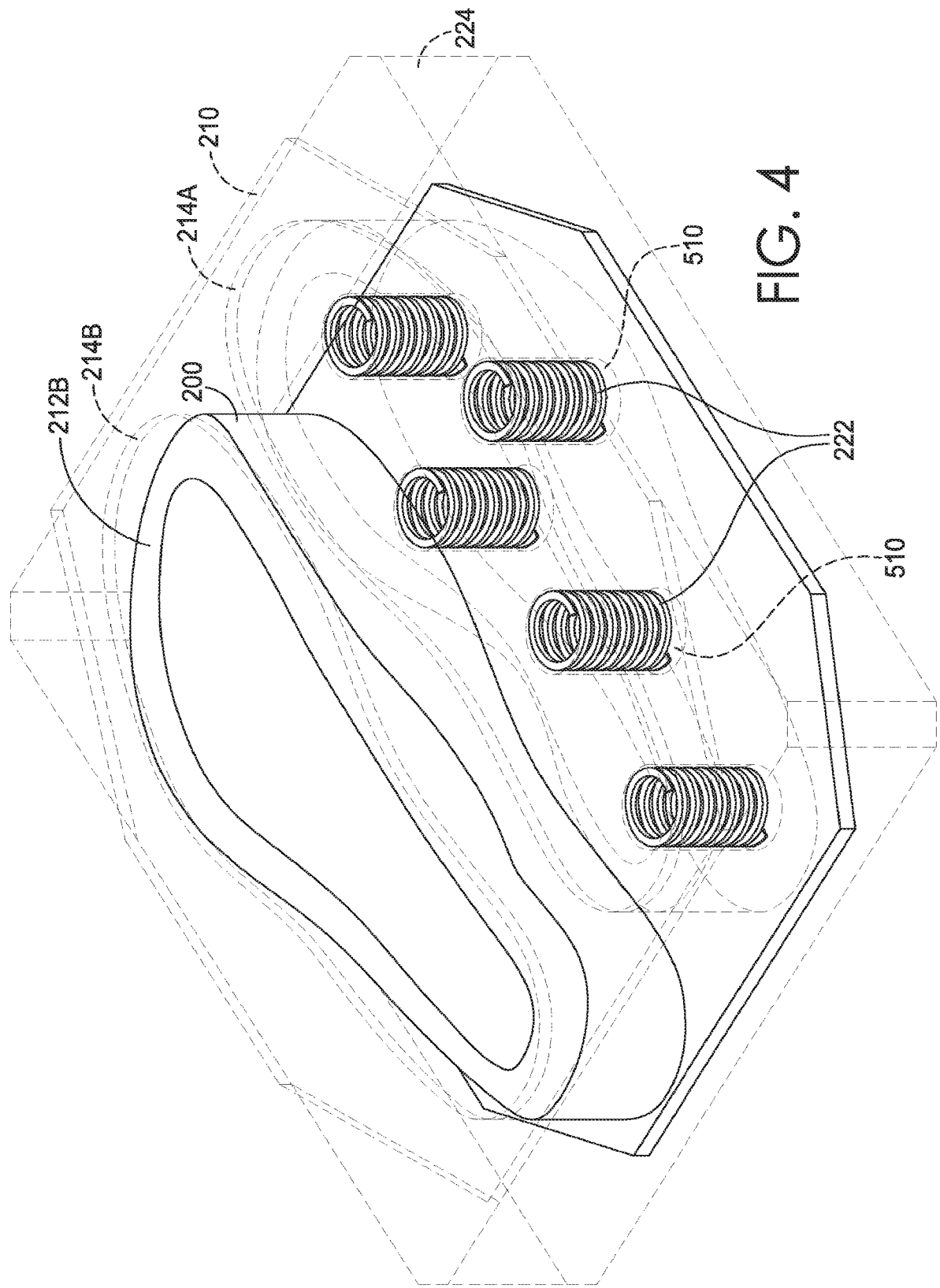
FIG. 4 depicts the lower mold portion of FIG. 2 positioned within a cavity of a base portion of the multi-part mold assembly, the base and a portion of the lower mold portion being cut away for ease of illustration, in accordance with exemplary aspects hereof.

With reference to FIG. 4, depicted is the lower mold portion 200 of FIG. 2 positioned within the cavity 226 (FIG. 3) of the base portion 224, the base portion 224 and a portion of the lower mold portion 200 being cut away for ease of illustration, in accordance with exemplary aspects hereof. As can be seen, vertical channels 510 in the lower mold portion 200 permit springs 510 to be positioned, expanded and compressed therein such that the second mold portion 200 may move in the substantially vertical direction within the base 224 upon application of appropriate forces, as more fully described below.

Figure 6:
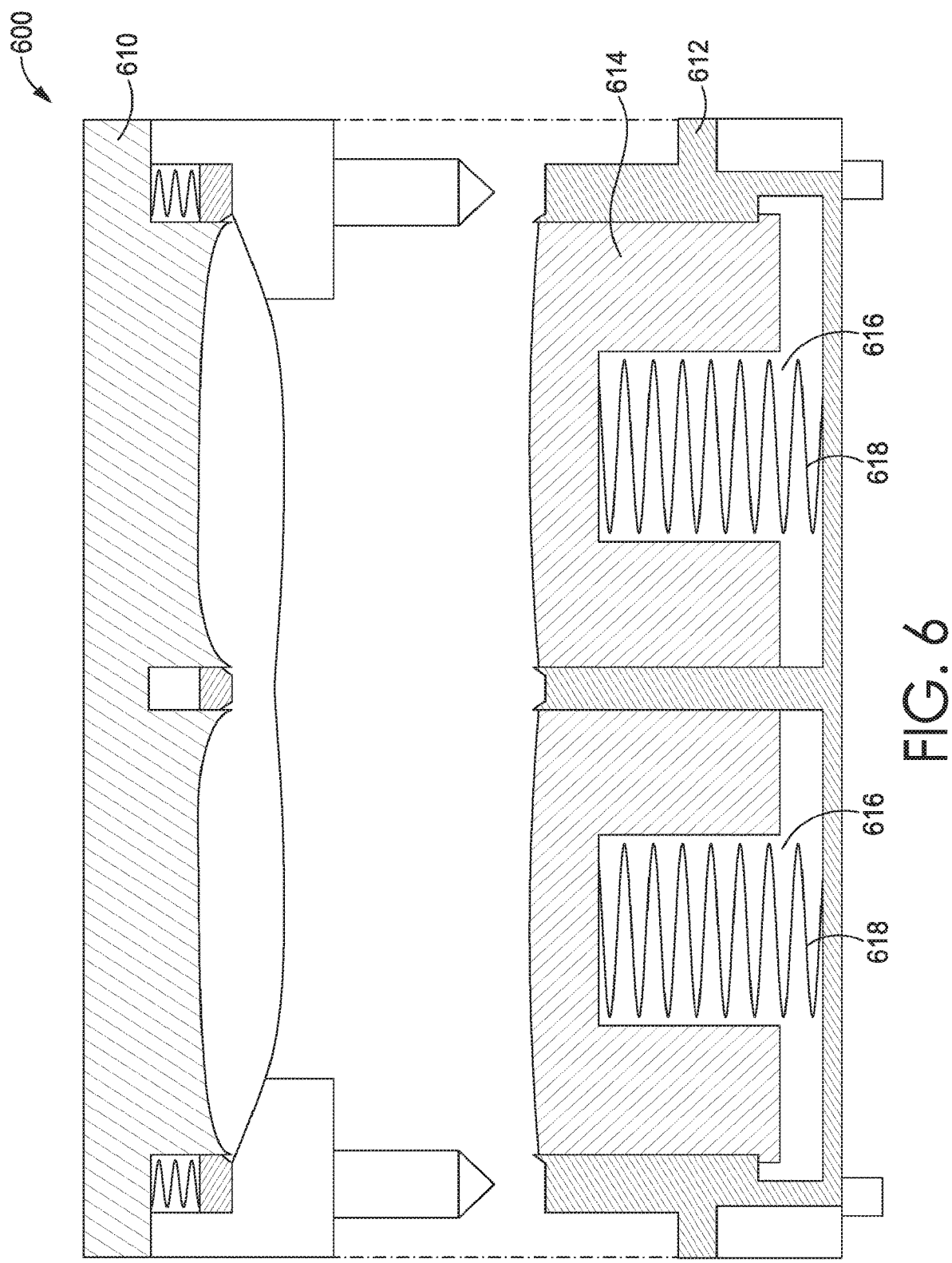
FIG. 6 depicts a cross section of the positioning of an upper mold portion of a multi-part mold assembly in cooperation with a lower mold portion, in accordance with exemplary aspects hereof.
Figure 7:
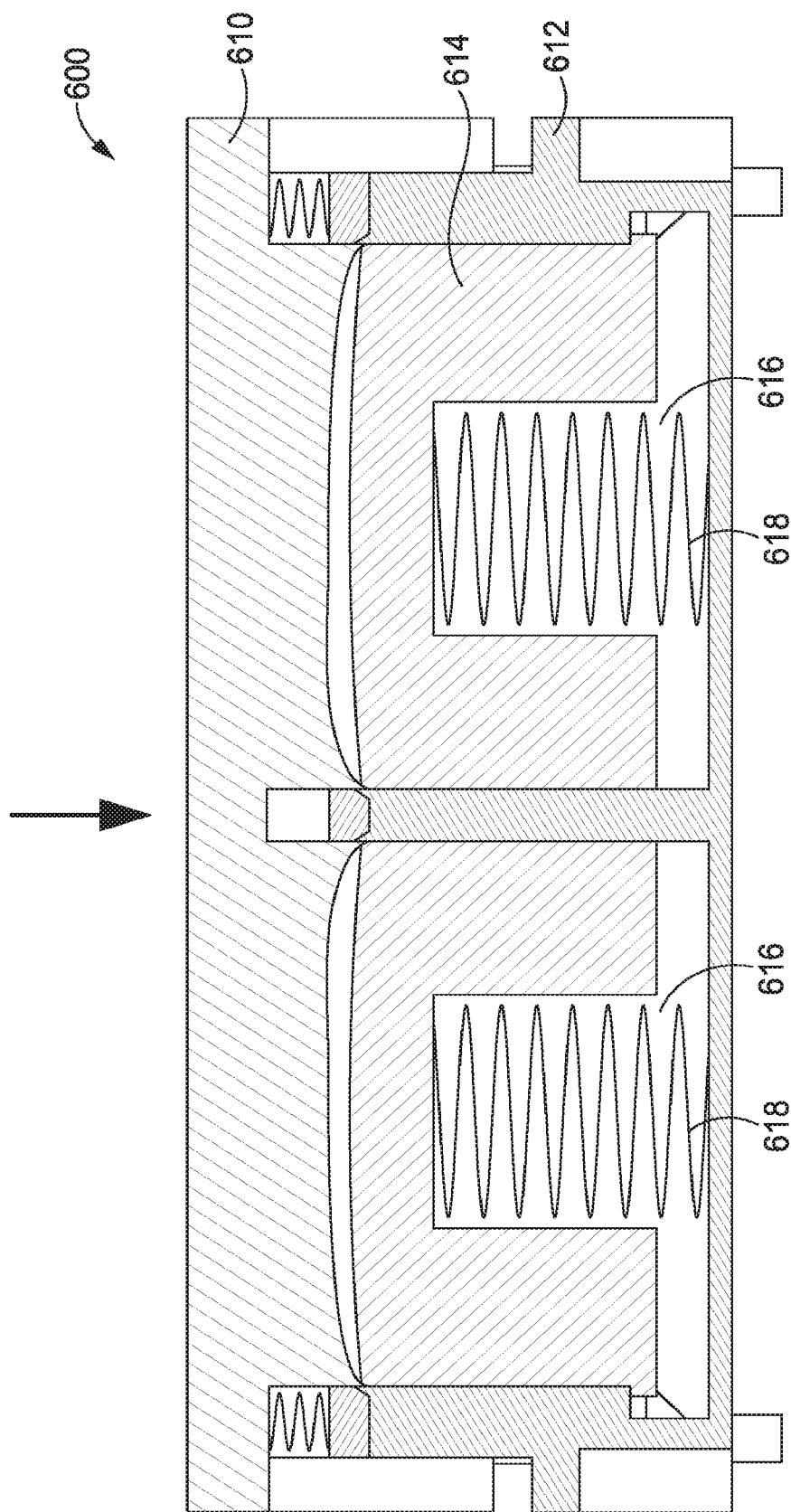
FIG. 7 depicts a cross section of the multi-part mold assembly of FIG. 6 upon a first force being applied to the springs, in accordance with exemplary aspects hereof.
Figure 8:
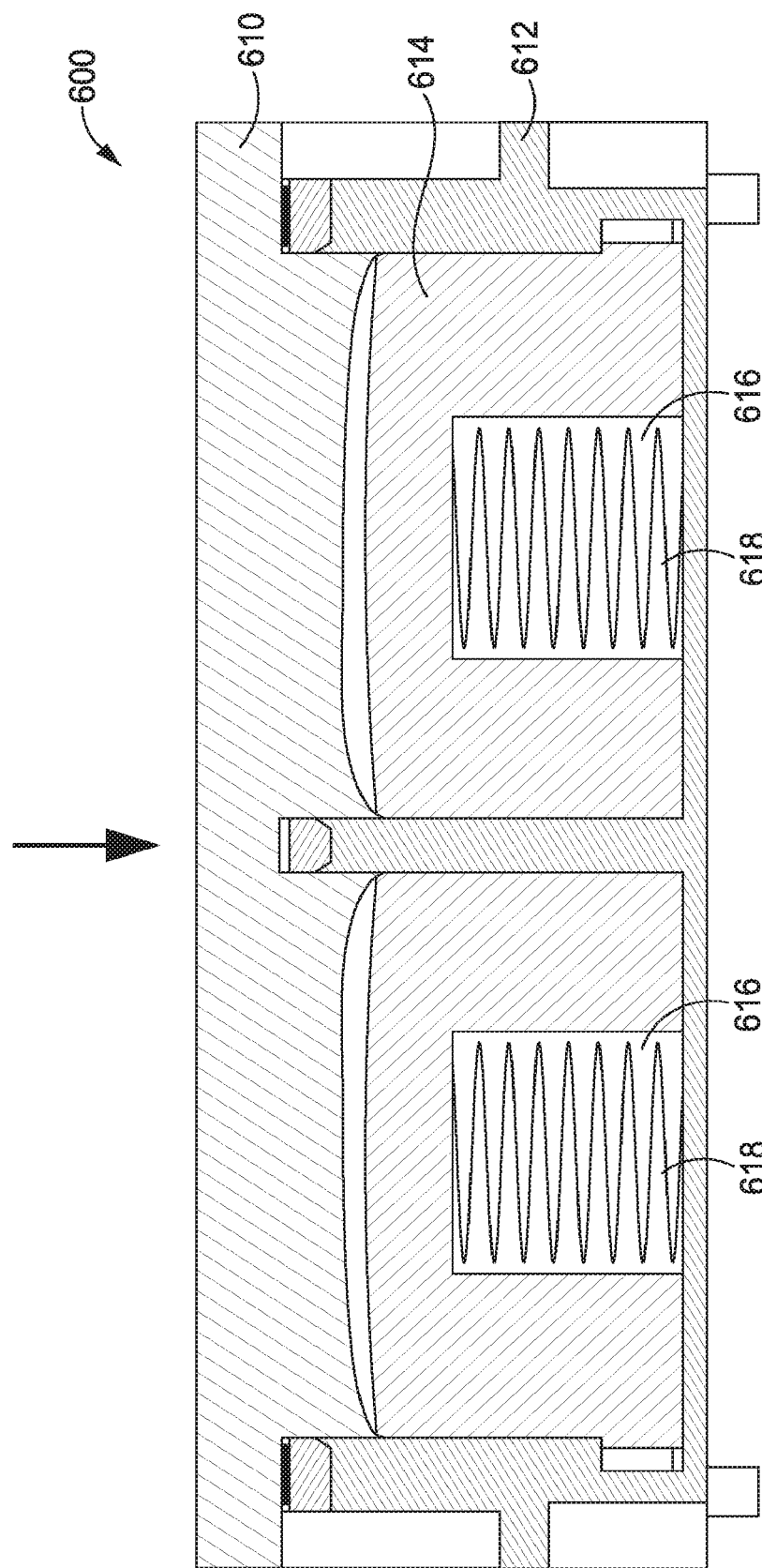
FIG. 8 depicts a cross section of the multi-part mold assembly of FIG. 6 upon a second force being applied to the springs, the second force being greater than the first force, in accordance with exemplary aspects hereof.

Turning now to FIGS. 6, 7 and 8, depicted are cross sections of a multi-part mold assembly 600 in accordance with aspects hereof, the relative positioning of the portions comprising the multi-part mold 600 being illustrated at various stages of the contouring, shaping and cutting/trimming process operation, in accordance with exemplary aspects hereof. FIG. 6 depicts a cross section of the positioning of an upper mold portion 610 of the multi-part mold assembly 600 prior to cooperative engagement of the upper mold portion 610, the lower mold portion 614 and base portion 612. The lower mold portion 614 is received within a cavity of the base portion 612 and springs 618 are received within vertical channels 616 in the lower mold portion 614. The springs 618 are substantially fully expanded within the vertical channels 616.

FIG. 7 depicts a cross section of the multi-part mold assembly 600 of FIG. 6 upon a first force being applied to the assembly 600, in accordance with exemplary aspects hereof. As can be seen, the upper portion 610 is in contact with the base portion 612 at appropriate locations. The first force is sufficient to initiate contouring and three-dimensional shaping of an appropriate material that may be positioned between the upper mold portion 610 and the lower mold portion 614. The springs 618 within the vertical channels 616 still are substantially fully expanded as the first force is insufficient to cause substantial spring compression. It will be understood and appreciated by those having ordinary skill in the art, however, that in some aspects hereof, slight to moderate compression of the springs 618 within the vertical channels 616 may occur upon application of the first force. However, even in such aspects, spring compression will be lesser than when the second force is applied.

FIG. 8 depicts a cross section of the multi-part mold assembly 600 of FIG. 6 upon a second force being applied to the assembly 600, the second force being greater than the first force, in accordance with exemplary aspects hereof. As can be seen, the second force is sufficient that the lower mold portion 614 is retracted relative to the base portion 612 causing the cutting/trimming portion of the operation to be initiated. Though less evident in FIG. 8, in this state, the springs 618 are compressed within the vertical channels 616.

Figure 9:
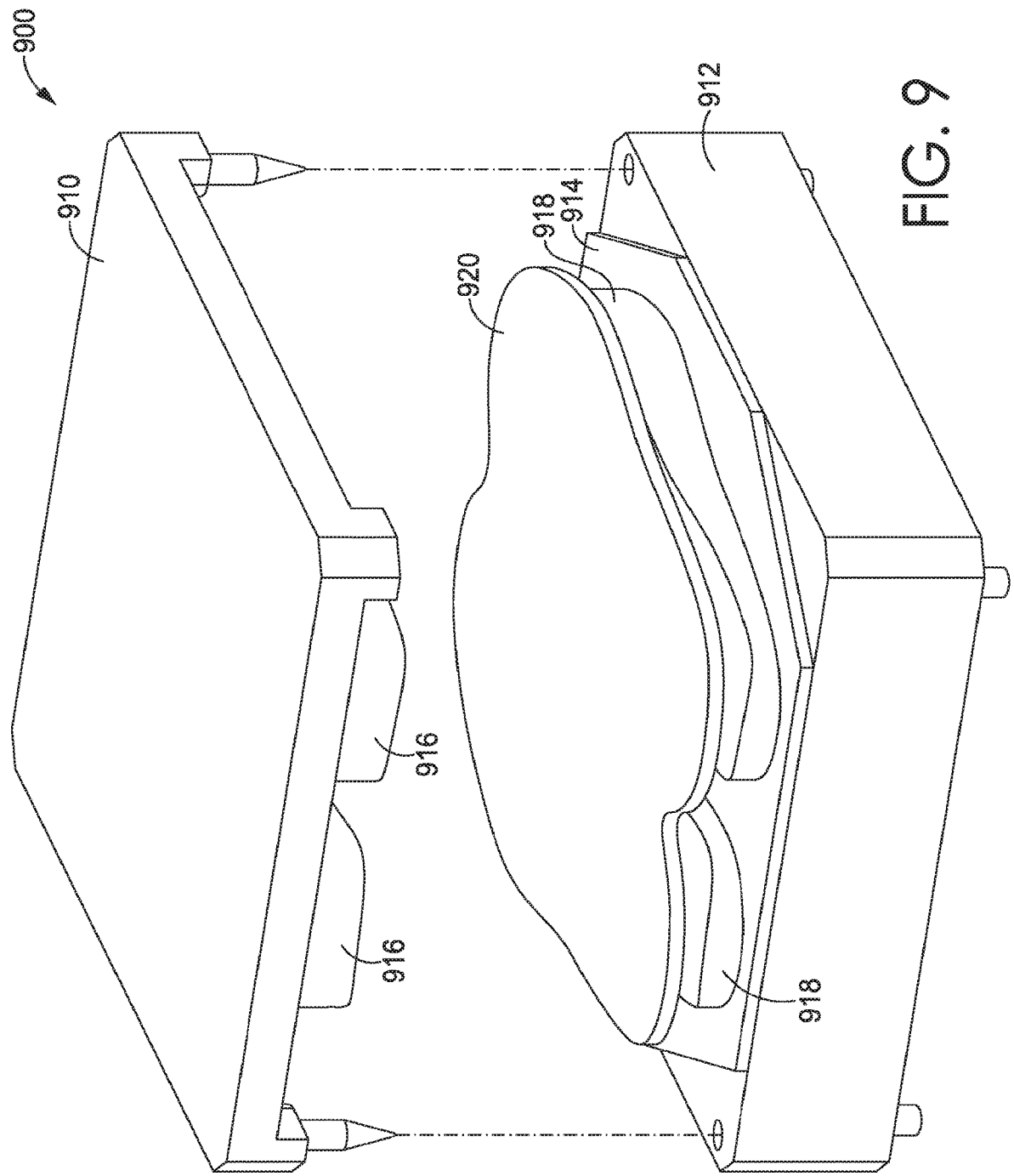
FIG. 9 depicts positioning of an upper mold portion of a multi-part mold assembly in cooperation with a lower mold portion, the upper and lower mold portions having a material from which a desired article is to be formed positioned there between, in accordance with exemplary aspects hereof.

Turning now to FIG. 9-13, operation of a multi-part mold assembly 900 to contour, shape and cut/trim a material from which a pair of sock liners will be formed sequentially is illustrated, in accordance with aspects hereof. With initial reference to FIG. 9, depicted is the positioning of an upper mold portion 910 of the multi-part mold assembly 900 prior to cooperative engagement of the upper mold portion 910, the lower mold portion 914 and base portion 912. The upper and lower mold portions 910, 914 have a material 920 positioned there between from which a desired article (a pair of sock liners) is to be formed, in accordance with exemplary aspects hereof. The material 920 is substantially planar and includes a first surface facing the upper mold portion 910 and a second surface (not visible) facing the lower mold portion 914. In particular exemplary embodiments, the first surface may be comprised of an ethylene vinyl-acetate (EVA) material and the second surface may be comprised of a mesh material, the EVA material and the mesh material being adhered to one another, for instance, through application of heat, pressure, or the like.

The upper mold portion 910 includes a portion (not visible) that includes a three-dimensional shape corresponding with an edge shape and a three-dimensional contour of the first surface of the to-be-formed pair of sock liners. The portion having the three-dimensional shape includes a first cutting edge 916 at the perimeter thereof.

The lower mold portion 914 includes a portion (not visible) that includes a three-dimensional shape corresponding with an edge shape and three-dimensional contour of the second surface of the to-be-formed pair of sock liners. The second surface is opposite the first surface (e.g., a top and bottom surface, respectively, of the planar material 920). The illustrated lower mold portion 914 further includes a second cutting edge 918 at a perimeter thereof. Though not visible in FIG. 9, the lower mold portion 914 additionally includes a plurality of vertical channels therein, each vertical channel housing a spring (as more fully described with reference to FIG. 13).

Figure 10:
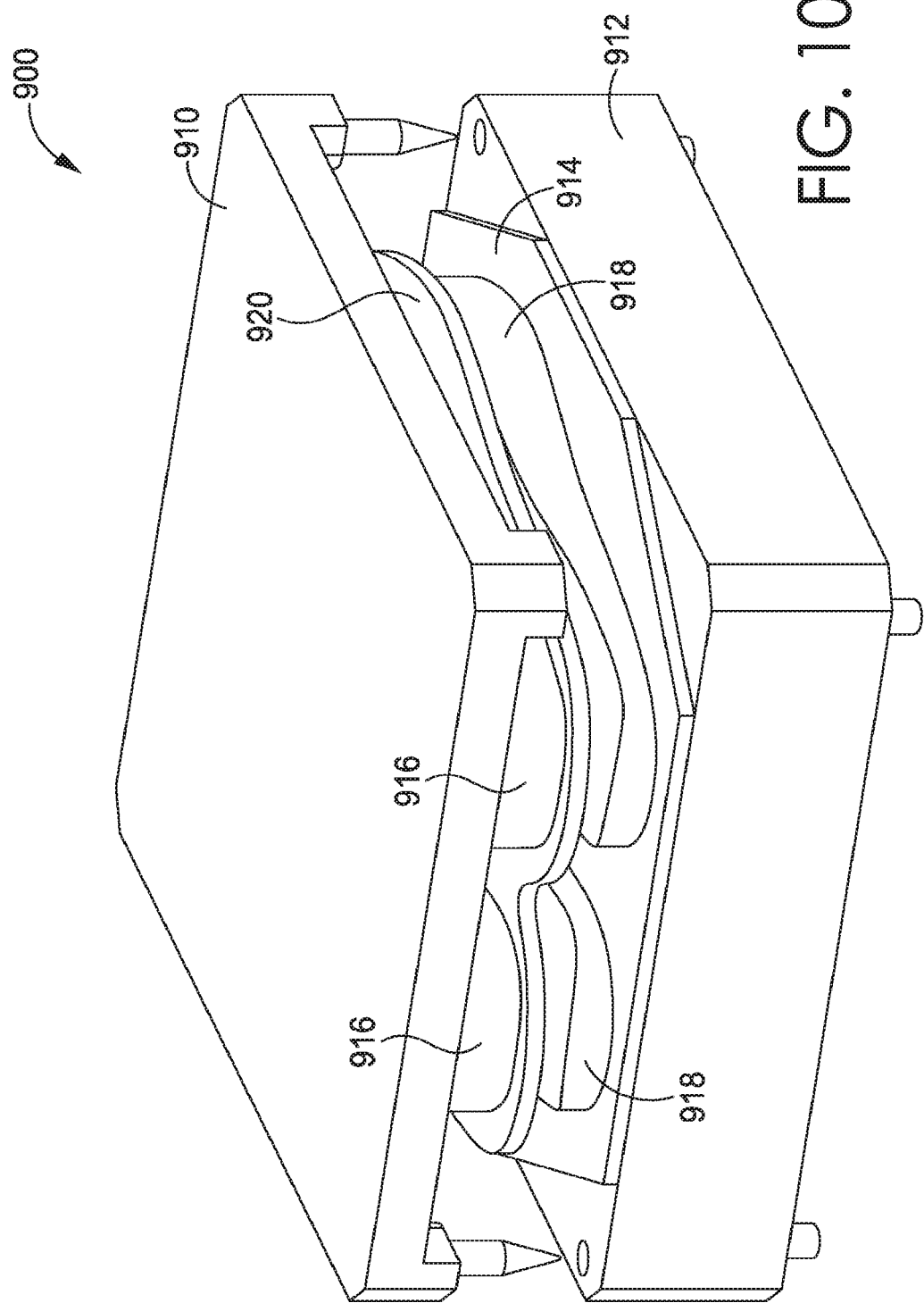
FIG. 10 depicts operation of the multi-part mold assembly of FIG. 9 as the upper mold portion becomes positioned such that a three-dimensional portion of the upper mold portion comes into contact with a first surface of the material, in accordance with exemplary aspects hereof.

FIG. 10 depicts the multi-part mold assembly 900 of FIG. as the upper mold portion 910 becomes positioned such that a three-dimensional portion of the upper mold portion (not visible) comes into contact with the first surface of the material 920, in accordance with exemplary aspects hereof. Note that the three-dimensional portions of the upper mold portion 910 and the lower mold portion 914 align with one another, as do the first cutting edge 916 and the second cutting edge 918. It will be understood that by "align," what is meant is that the upper mold portion 910 and the lower mold portion 914 are positioned such that they cooperate to form the processed article (e.g., the pair of sock liners). Use of the term "align" is not intended to mandate any particular exact planar alignment but rather cooperative alignment of the various portions of the assembly 900.

Figure 11:
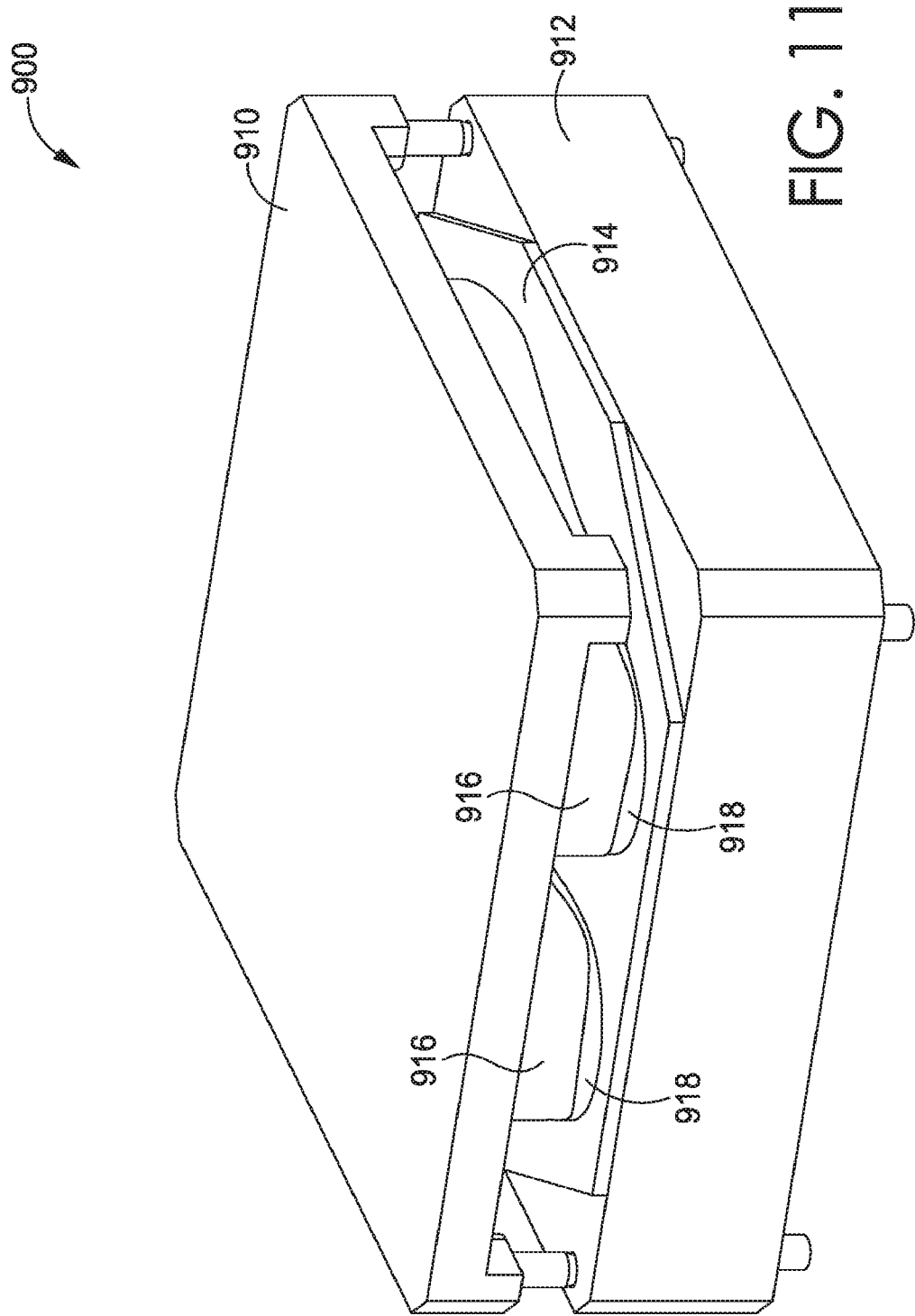
FIG. 11 depicts continued operation of the multi-part mold assembly of FIG. 10 as contouring of the material via contact with and cooperation of the respective three-dimensional portions of the upper and lower mold assemblies is initiated, in accordance with exemplary aspects hereof.

FIG. 11 depicts continued operation of the multi-part mold assembly 900 of FIG. 10 as contouring and three-dimensional shaping of the material 920 via contact with and cooperation of the respective three-dimensional portions of the upper mold portion 910 and the lower mold portion 914, as well as the base portion 912, is initiated, in accordance with exemplary aspects hereof. Stated differently, FIG. 11 depicts the multi-part mold assembly 900 of FIG. 10 as a first force is applied thereto. The first force is sufficient to bring the first surface of the material 920 into contact with the upper mold portion 910 to initiate contouring and three-dimensional shaping of the material 920. Though not illustrated in FIGS. 9-12, springs within vertical channels of the lower mold portion still are substantially fully expanded as the first force is insufficient to cause substantial spring compression. It will be understood and appreciated by those having ordinary skill in the art, however, that in some aspects hereof, slight to moderate compression of the springs within the vertical channels may occur upon application of the first force. However, even in such aspects, spring compression will be lesser than when the second force is applied. As illustrated in FIG. 11, a lesser distance separates the first cutting edge 916 and the second cutting edge 918, but during application of the first force, substantial cutting/trimming of the material 920 does not occur.

Figure 12:
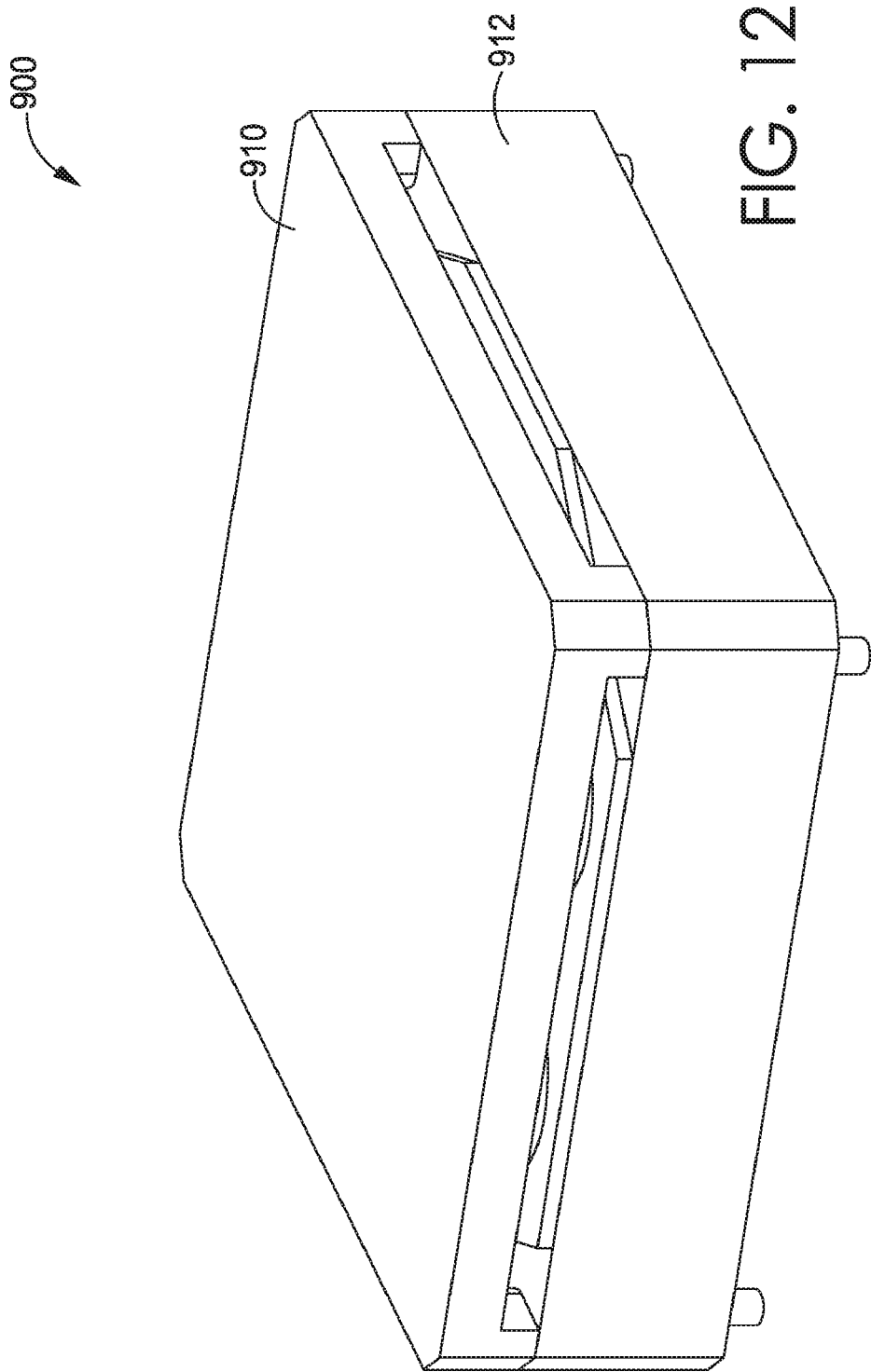
FIG. 12 depicts continued operation of the multi-part mold assembly of FIG. 11 as the lower mold portion becomes fully retracted into a cavity formed in the assembly base such that shearing of the material is performed, in accordance with exemplary aspects hereof.

With reference to FIG. 12, depicted is continued operation of the multi-part mold assembly 900 of FIG. 11 as the lower mold portion 914 becomes fully retracted into the cavity (not visible) formed in the base portion 912 such that cooperation of the first cutting edge 916 and the second cutting edge 918 causes shearing of the material 920, in accordance with exemplary aspects hereof. Stated differently, FIG. 12 depicts the multi-part mold assembly 900 of FIG. 11 upon application of a second force, the second force being greater than the first force, in accordance with aspects hereof. The second force is sufficient that the lower mold portion 914 is retracted relative to the base portion 912 causing the cutting/trimming portion of the operation to be initiated.

Figure 13:
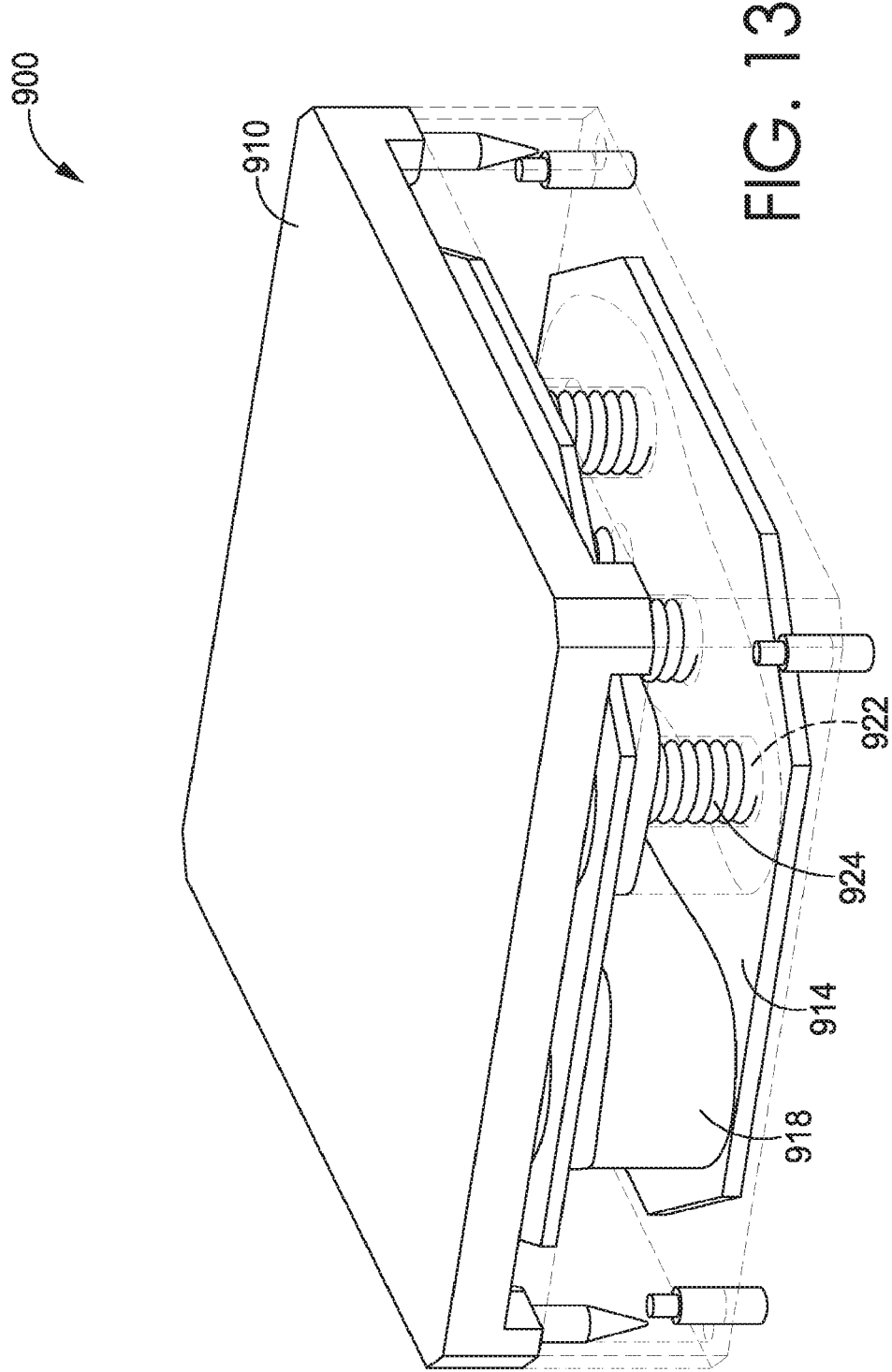
FIG. 13 depicts the operational stage illustrated in FIG. 12 with a base and a portion of the lower mold portion being cut away for ease of illustration of the compressed springs, in accordance with exemplary aspects hereof.

Turning to FIG. 13, the operational stage illustrated in FIG. 12 is depicted with the base portion 912 and a portion of the lower mold portion 914 being cut away for ease of illustration, in accordance with exemplary aspects hereof. As can be seen, in the depicted operational state, the second force is sufficient that the lower mold portion 914 is retracted relative to the base portion 912 causing the cutting/trimming portion of the operation to be initiated. In this state, the springs 924 are compressed within the vertical channels 922.

Figure 15:
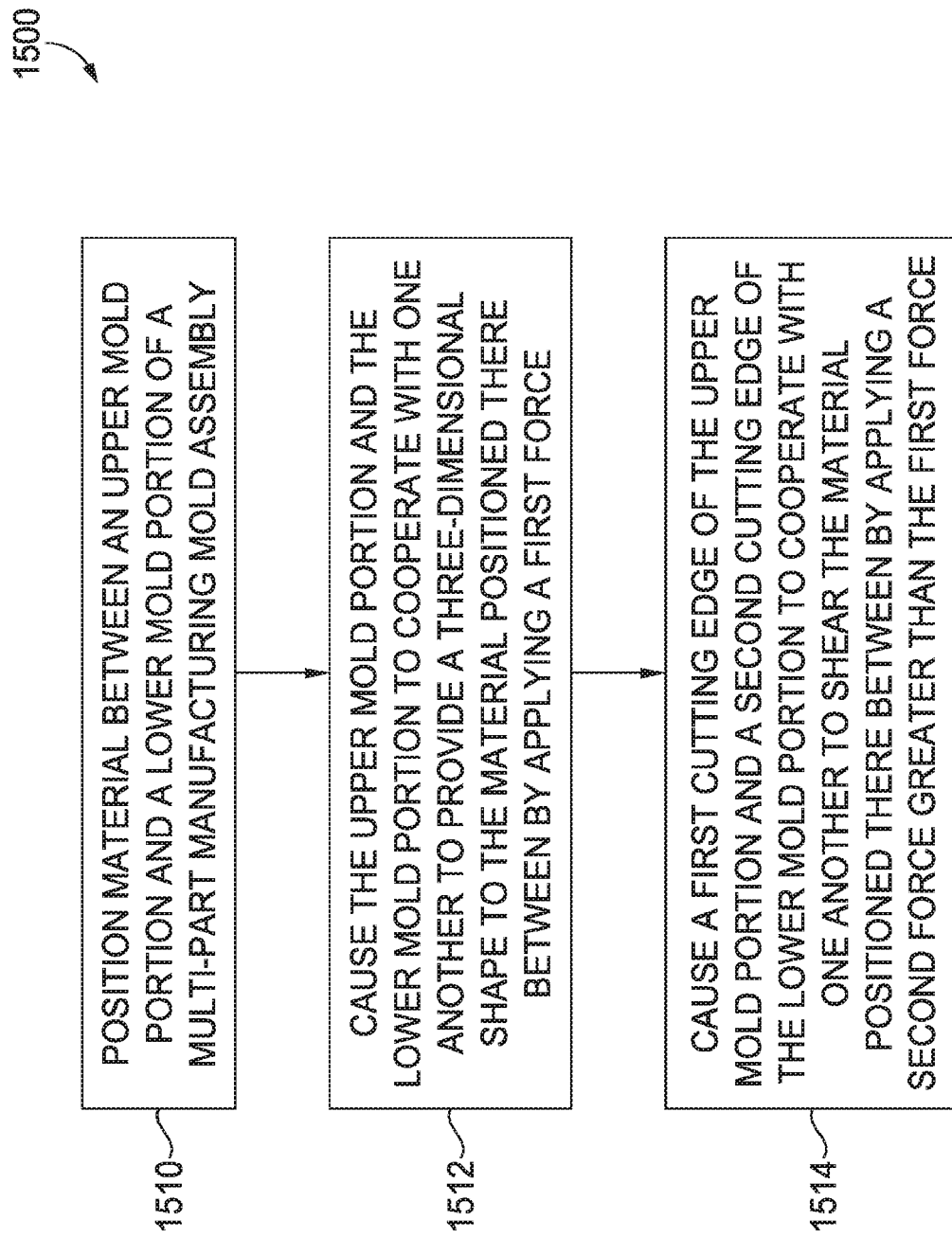
FIG. 15 depicts a flow diagram illustrating a method of manufacturing a sock liner utilizing a multi-part mold assembly, in accordance with an exemplary aspect hereof.

Turning now to FIG. 15, depicted is a flow diagram illustrating a method 1500 of manufacturing a sock liner utilizing a multi-part mold assembly, in accordance with an exemplary aspect hereof. As indicated at block 1510, a material is positioned between an upper mold portion and a lower mold portion of the multi-part manufacturing mold assembly. The upper mold portion has at least a portion that includes a three-dimensional shape corresponding with a contour and a dimensional shape of a first surface of the sock liner, the three-dimensional shape having a first cutting edge at at least a portion of a perimeter thereof. The lower mold portion includes at least a portion that includes a three-dimensional shape corresponding with a contour and a dimensional shape of a second, opposite surface of the sock liner, the three-dimensional shape of the lower mold portion having a second cutting edge at at least a portion of a perimeter thereof. The lower mold portion includes at least one spring positioned in a vertical channel thereof.

As indicated at block 1512, the upper mold portion and the lower mold portion are caused to cooperate with one another (for instance, upon application of an appropriate first force) to provide a three-dimensional shape to the material positioned there between by applying. As indicated at block 1514, the first cutting edge of the upper mold portion and the second cutting edge of the lower mold portion are caused to cooperate with one another to shear the material positioned there between by applying a second force to the at least one spring, the second force being greater than the first force.

As can be seen, aspects hereof relate to a multi-frame manufacturing apparatus for manufacturing articles, for instance, sock liners, formed of a non-rigid material. Aspects hereof further relate to a method of manufacturing articles, for instance, sock liners, utilizing a multi-frame manufacturing apparatus. A multi-frame manufacturing apparatus having a structure as described herein permits interchangeability of the position of multiple manufacturing frames enabling processing of one or more articles to progress while material for another article is being loaded onto the apparatus. A multi-frame manufacturing apparatus having a structure as described herein further permits processing of a portion of a non-rigid material separated from a larger material stock, the portion being held in a non-tensioned state during processing and, accordingly, reducing waste occasioned by deformed and consequently unusable articles.

Although the multi-frame manufacturing apparatus and method of manufacturing articles formed from non-rigid materials utilizing a multi-frame manufacturing apparatus are described above by referring to particular aspects, it should be understood that modifications and variations could be made without departing from the intended scope of protection provided by the following claims. It will be understood that certain features and sub-combinations are of utility and may be employed without reference to other features and sub-combinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

What is claimed is:

1. A manufacturing mold assembly comprising:
    a movable upper mold portion that includes at least a portion that includes a three-dimensional shape corresponding with a contour of a first surface of an article to be manufactured utilizing the manufacturing mold assembly, a periphery portion surrounding the three-dimensional shape, and an intermediate spring disposed between the periphery portion and the movable upper mold portion, wherein the three-dimensional shape has a first cutting edge at least a portion of a perimeter thereof, wherein the first cutting edge is removably coupled to fixedly formed on the movable upper mold portion;
    a lower mold portion comprising:
    having at least a first portion and a second portion that having include a three-dimensional shape corresponding with a contour of a second, opposite surface of the article to be manufactured utilizing the manufacturing mold assembly, each of the first portion and second portion three-dimensional shape of the lower mold portion having a second cutting edge at least a portion of a perimeter thereof;
    a cutting plate portion having comprising at least one aperture shaped to receive the first portion and the second portion, wherein the at least one aperture includes the second cutting edge at least at a portion of a perimeter thereof;
    and at least one vertical channel therein configured for receiving one or more springs, wherein the second cutting edge is removably coupled to fixedly formed on the lower mold portion; and
    a base portion comprising at least one cavity configured to receive the lower mold portion, such that wherein the lower mold portion is retractable in a substantially vertical direction relative to the base portion upon a first force being applied to the at least one or more springs positioned within the at least one vertical channel, and the lower mold portion as well as the movable portion of the movable upper mold portion retractable in the substantially vertical direction relative to the base portion upon a second force being applied to the intermediate spring and the one or more springs.

2. The manufacturing mold assembly of claim 1, wherein upon application of the first force to the one or more springs at least one spring, the movable upper mold portion and the lower mold portion cooperate to provide a three-dimensional shape to a material positioned between the movable upper mold portion and the lower mold portion.

3. The manufacturing mold assembly of claim 2, wherein upon application of the second force to the one or more springs, the second force being greater than the first force, the first cutting edge and the second cutting edge cooperate to shear the material positioned between the movable upper mold portion and the lower mold portion.

4. The manufacturing mold assembly of claim 1, wherein the first cutting edge is integral to the movable upper mold portion.

5. The manufacturing mold assembly of claim 1, wherein the first cutting edge is removably coupled with the movable upper mold portion.

6. The manufacturing mold assembly of claim 1, wherein the second cutting edge is integral to the lower mold portion.

7. The manufacturing mold assembly of claim 6, wherein the first surface of the article to be manufactured utilizing the manufacturing mold assembly is comprised of an EVA material, wherein the second surface of the article to be manufactured utilizing the manufacturing mold assembly is comprised of a mesh material, and wherein the EVA material and the mesh material are adhered to one another.

8. The manufacturing mold assembly of claim 1, wherein the second cutting edge is removably coupled with the lower mold portion.

9. The manufacturing mold assembly of claim 1, wherein the article to be manufactured is a sock liner for use with a shoe.

10. A manufacturing mold assembly comprising:
a movable upper mold portion that includes at least a portion that includes a three-dimensional shape corresponding with a contour of a first surface of an article to be manufactured utilizing the manufacturing mold assembly, a periphery portion surrounding the three-dimensional shape, and an intermediate spring disposed between the periphery portion and the movable upper mold portion, wherein the three-dimensional shape has a first cutting edge at least a portion of a perimeter thereof, wherein the first cutting edge is removably coupled to the movable upper mold portion;
a lower mold portion having at a first portion and a second portion, each having least a portion that includes a three-dimensional shape corresponding with a contour of a second, opposite surface of the article to be manufactured utilizing the manufacturing mold assembly, the lower mold portion having a plurality of vertical channels therein, each vertical channel configured for receiving a spring wherein a second cutting edge is removably coupled to the lower mold portion;
a cutting plate having at least one aperture therein that is shaped to receive the lower mold portion, the at least one aperture having the second cutting edge at least at a portion of a perimeter thereof; and
a base portion comprising at least one cavity configured to receive the lower mold portion, the base portion also configured for supporting the cutting plate and having at least one cavity therein shaped for receiving the lower mold portion such that the lower mold portion is retractable in a substantially vertical direction within the at least one cavity of the base portion upon a first force being applied to a plurality of springs positioned within the plurality of vertical channels and the lower mold portion as well as the movable portion of the movable upper mold portion retractable in the substantially vertical direction relative to the base portion upon a second force being applied to the intermediate spring and the spring.

11. The manufacturing mold assembly of claim 10, wherein upon application of the first force to the plurality of springs, the movable upper mold portion and the lower mold portion cooperate to provide a three-dimensional shape to a material positioned between the movable upper mold portion and the lower mold portion.

12. The manufacturing mold assembly of claim 11, wherein upon application of the second force to the plurality of springs, the second force being greater than the first force, the first cutting edge of the movable upper mold portion and the second cutting edge of the cutting plate cooperate to shear the material positioned between the movable upper mold portion and the lower mold portion.

13. The manufacturing mold assembly of claim 10, wherein the first cutting edge is integral to the movable upper mold portion.

14. The manufacturing mold assembly of claim 13, wherein the first surface of the article to be manufactured utilizing the manufacturing mold assembly is comprised of an EVA material, wherein the second surface of the article to be manufactured utilizing the manufacturing mold assembly is comprised of a mesh material, and wherein the EVA material and the mesh material are adhered to one another.

15. The manufacturing mold assembly of claim 10, wherein the article to be manufactured is a sock liner for use with a shoe.

* * * * *

UNITED STATES PATENT AND TRADEMARK OFFICE
CERTIFICATE OF CORRECTION

| | |
|---|---|
| PATENT NO. | : 11,331,870 B2 |
| APPLICATION NO. | : 15/992397 |
| DATED | : May 17, 2022 |
| INVENTOR(S) | : Todd R. Farr and Howard Fu |

It is certified that error appears in the above-identified patent and that said Letters Patent is hereby corrected as shown below:

In the Claims

Column 11, Line 31: In Claim 10, delete "having at" and insert -- having --.

Signed and Sealed this
Eighteenth Day of June, 2024

Katherine Kelly Vidal
*Director of the United States Patent and Trademark Office*